(12) United States Patent
Lamstein et al.

(10) Patent No.: US 7,958,851 B2
(45) Date of Patent: Jun. 14, 2011

(54) CATNIP ENHANCED CAT SCRATCHER

(75) Inventors: Aaron Lamstein, San Rafael, CA (US); David Haaf, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 879 days.

(21) Appl. No.: 11/895,437

(22) Filed: Aug. 24, 2007

(65) Prior Publication Data

US 2007/0295282 A1 Dec. 27, 2007

Related U.S. Application Data

(63) Continuation of application No. 11/386,627, filed on Mar. 22, 2006, now abandoned.

(51) Int. Cl.
*A01K 15/02* (2006.01)
(52) U.S. Cl. .......................................... 119/706; 119/711
(58) Field of Classification Search .......... 119/706–708, 119/702, 711, 710, 709; D30/119, 160
See application file for complete search history.

(56) References Cited

U.S. PATENT DOCUMENTS

| 2,006,817 | A | * | 7/1935 | Voigtmann | 361/329 |
| 2,753,829 | A | * | 7/1956 | Agra | 114/219 |
| 3,085,551 | A | * | 4/1963 | Helmer | 119/706 |
| 5,450,819 | A | * | 9/1995 | Gray et al. | 119/706 |
| 5,615,638 | A | * | 4/1997 | Thornton | 119/165 |
| 6,216,640 | B1 | * | 4/2001 | Zelinger | 119/707 |
| 7,011,043 | B2 | * | 3/2006 | Diep | 119/601 |
| 2004/0194731 | A1 | * | 10/2004 | Lineberry | 119/706 |
| 2005/0011469 | A1 | * | 1/2005 | Lipscomb et al. | 119/706 |
| 2006/0137623 | A1 | * | 6/2006 | Lamstein | 119/706 |

FOREIGN PATENT DOCUMENTS

| EP | 34868 A | * | 2/1980 |
| JP | 07298803 A | * | 5/1994 |

OTHER PUBLICATIONS

English translation of Japanese Patent JP7-298803-A to Hotta pp. 2/22 to 22/22.*

* cited by examiner

*Primary Examiner* — Andrea M Valenti
(74) *Attorney, Agent, or Firm* — Bay Area Technology Law Group PC

(57) ABSTRACT

A recreational pet toy for cats which includes an outer covering and a cord attached to the pet toy for hanging the recreational pet toy during use. The pet toy also includes an elongated channel for receiving catnip and distributing the catnip along its length.

18 Claims, 5 Drawing Sheets

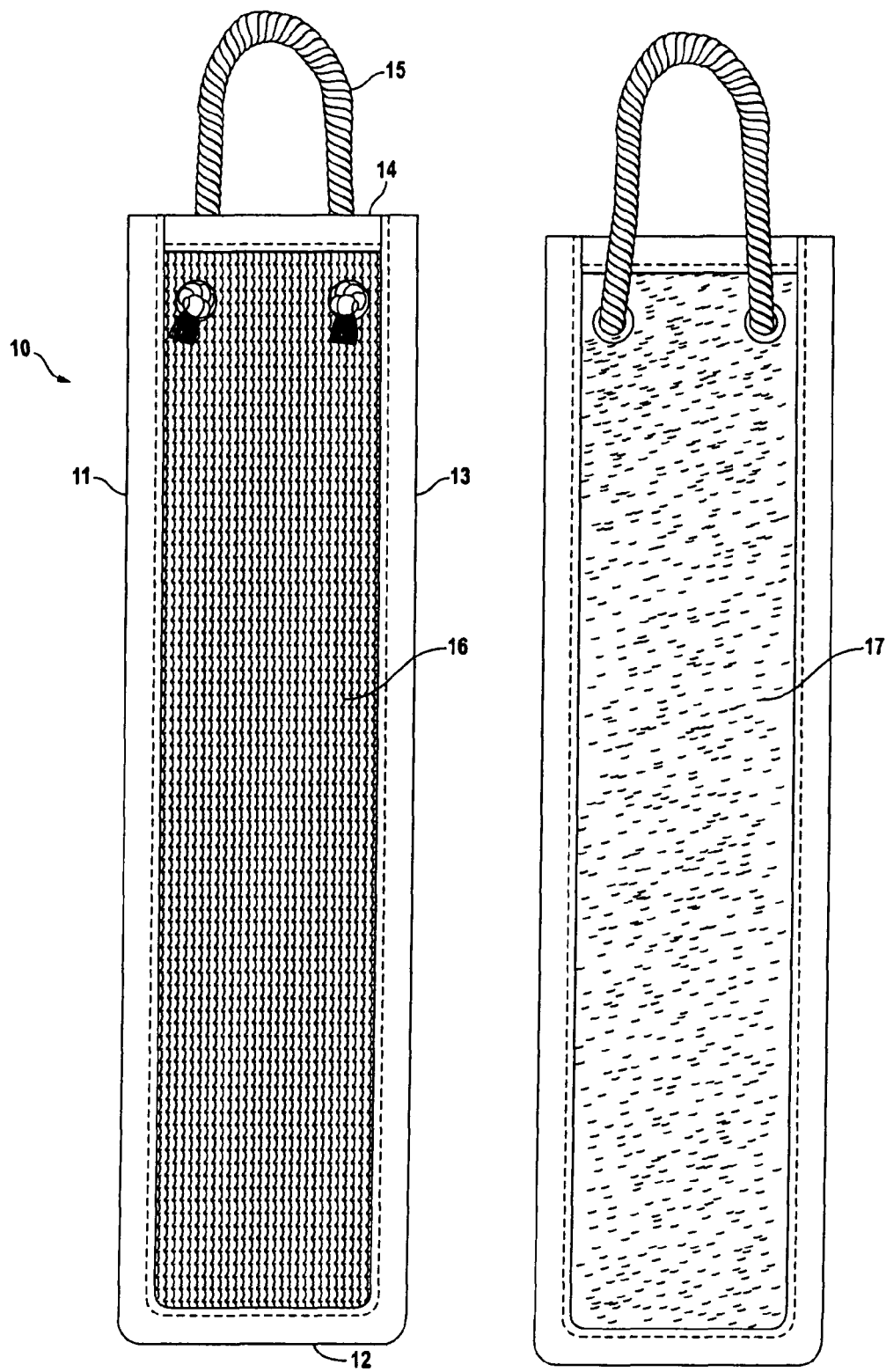

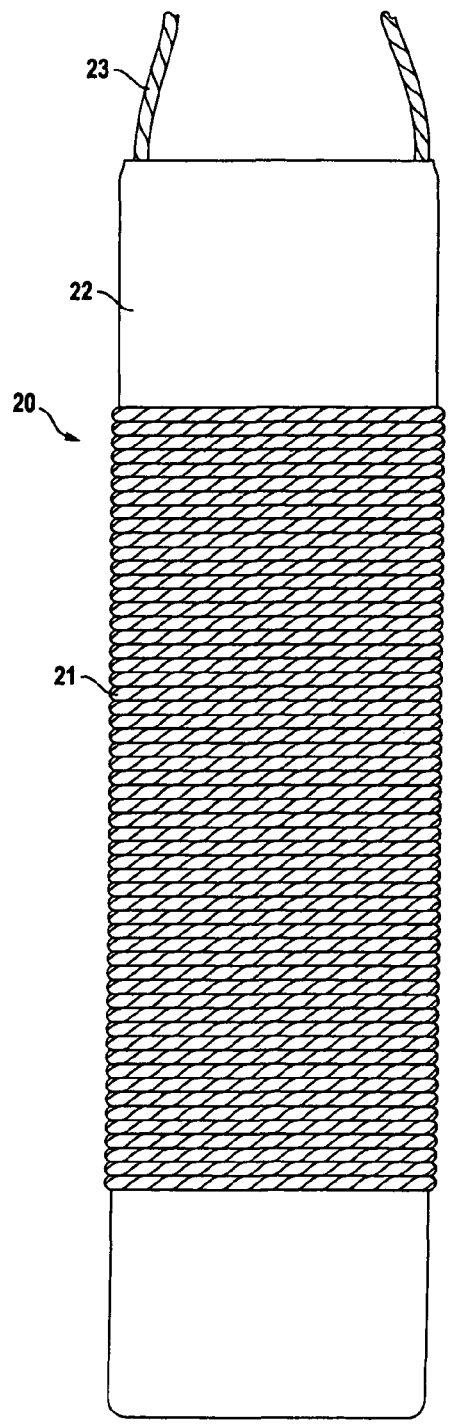 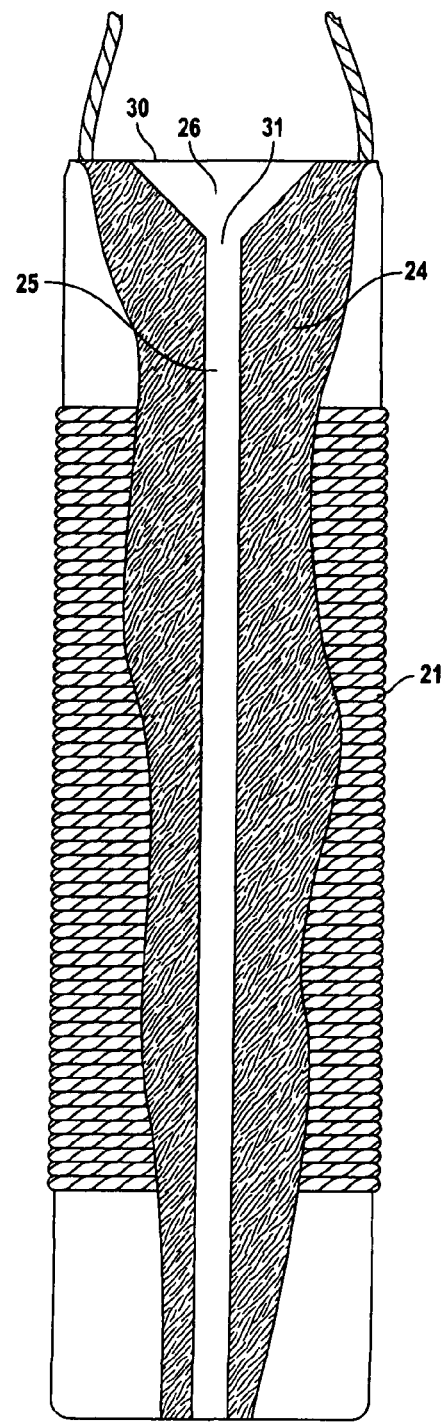
FIG. 2
FIG. 3

CATNIP ENHANCED CAT SCRATCHER

RELATED APPLICATION

This is a continuation of U.S. patent application Ser. No. 11/386,627 filed on Mar. 22, 2006 now abandoned.

TECHNICAL FIELD

The present invention involves a recreational pet toy for cats which is intended to hang vertically and provide an inner channel for receiving and displaying catnip to a pet cat, the channel being beneath an outer cover for enabling the catnip odor to effect the cat while preventing the cat from accessing the catnip itself.

BACKGROUND OF THE INVENTION

The effect of catnip on virtually all feline species is well known. Catnip or NEPATIA CATAIRA is a plant native to North America. The dry leaves of the catnip plant express a mint-like scent. Catnip has a hallucinogenic effect upon cats, although it is not toxic. This "catnip response" is due to the plant's active ingredient, NEPETALACTONE.

When a cat smells catnip, it characteristically exhibits a range of behaviors somewhat dependent upon the age of a cat and whether it is capable of reproduction. Most reactions last from five minutes to fifteen minutes and include sniffing, licking, chewing, chin and cheek rubbing, and head-over roll and body rubbing. The feline receptor to the active ingredient, NEPETALACTONE, is contained within the animal's vomeronasal organ located above the feline palate. The location of the vomeronasal organ may explain why cats do not react from eating gelatin capsules of catnip. NEPETALACTONE must be inhaled for it to reach the receptors in this organ.

Many pet toys intended for feline use contain catnip. However, many of these toys, in an attempt to insure that the catnip is not made accessible to the cat, imbed the catnip deeply within the toy thus negating its effect by limiting the intended "catnip response." Other cat toys are intended for providing a nondestructive scratching platform providing the cat with a surface to enable the cat to carry out its innate scratching response.

It has been recognized that an ideal recreational toy for a cat would include a scratching surface as well as a relatively large catnip reservoir enabling the cat to both scratch and do so in conjunction with the anticipated "catnip response" encouraged by such a configuration.

It is thus an object of the present invention to provide a recreational pet toy for cats which has a relatively large surface area, a covering which is somewhat resistant to cat scratching activity and which can provide catnip odors to encourage the "catnip response" highly sought after by cat owners.

It is yet a further object of the present invention to provide a recreational pet toy for cats which can be hung vertically such as from a doorknob while lying relatively flat against a vertical surface to provide a suitable cat scratching surface for a pet cat in conjunction with the dispensing of catnip odors.

These and further objects of the present invention will be more readily appreciated when considering the following disclosure and appended drawings.

SUMMARY OF THE INVENTION

The present invention is directed to a recreational pet toy for cats comprising either a soft tubular or rigid planar member, each having a cord attached to the pet toy for hanging the recreational pet toy during use. Each embodiment includes an elongated channel for receiving catnip and for distributing the catnip along the tubular or rigid planar member.

BRIEF DESCRIPTION OF THE DRAWINGS

FIGS. 1A, 1B, 2 and 5 show the exterior surfaces of typical embodiments of the recreational pet toy of the present invention.

FIG. 3 is a partial cutaway view of one embodiment of the recreational pet toy of FIG. 2.

DETAILED DESCRIPTION OF THE INVENTION

Figure 1C:
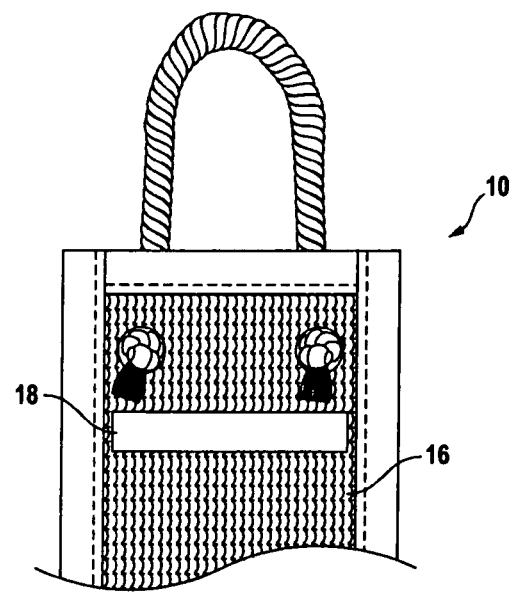
FIG. 1C is a partial front view of an embodiment of the present invention depicting a fabric flap for use herein.

Turning first to FIGS. 1A and 1B, the front and back sides of recreational pet toy 10 are illustrated. Ideally, the recreational pet toy of the present invention is rectangularly shaped having long edges 11 and 13 which generally extend vertically when the present invention is in use and short edges 12 and 14 generally oriented horizontally when recreational pet toy 10 is in use.

Although recreational pet toy 10 can be used in virtually any orientation, it is ideally employed by making use of cord or rope 15 which is sized to enable recreational pet toy 10 to hang from, for example, a doorknob. The pet cat would then use either sisal surface 16 or rug surface 17 as a scratching medium. In doing so, the present invention makes use of surfaces 16 and 17 noting that one surface over another may be more preferable to some cats while the general longevity of the pet toy is extended by providing multiple surfaces for scratching.

Although FIGS. 1A and 1B show sisal and carpet as two excellent surfaces for facilitating cat scratching activity, the present invention is not limited to such surfaces. For example, FIG. 2 illustrates recreational pet toy 20 in the form of a substantially rectangular body having fabric cover 22 and helically wound rope 21. Rope 21 again acts as an excellent cat scratching medium noting further that as one side of recreational pet toy 20 is abraded through cat scratching activity, the present invention can simply be flipped to present a fresh rope surface to an engaged pet cat.

Turning to FIG. 3, a first embodiment showing the internal elements of the pet toy of FIG. 2 is depicted. In this regard, as previously noted, an important aspect contributing to the utility of the present invention is providing a quantity of catnip to invoke a "catnip response" by a cat engaged in scratching activity. Besides contributing to the pleasure that a cat would experience in combining a scratching surface with catnip, the inclusion of catnip encourages a pet cat to employ the present invention rather than household objects such as furniture and rugs, destructive to the cat's environment.

In constructing the embodiment of FIG. 2, a rigid planar member 24 is provided beneath the outer covering, be it the sisal or rug covering the fabric and rope covering of FIG. 2.

The geometry of rigid planar member 24 determines the overall shape of the recreational pet toy so that in the embodiment shown in the accompanying figures, rigid planar member 24 is generally rectangular shaped. This element of the present invention can be comprised of any suitable rigid planar material such as fiberboard, wood, cardboard, plastic or resin, the choices of which would be quite apparent to those skilled in this art.

In one embodiment of the present invention, an elongated, and preferably linear channel 25, for receiving catnip (not shown) and for distributing the catnip along rigid planar member 24 is shown. In the embodiment of FIG. 3, elongated channel 25 is shown to extend along virtually the entire length of the recreational pet toy 20 parallel to its long axis thus extending vertically as recreational pet toy 20 is suspended by rope or cord 23. In doing so, the odors emanating from catnip contained within some or all of linear channel 25 permeates through outer fabric 22 and helically roped area 21 in order to invoke the sought after "catnip response."

Recognizing that catnip ages and thus loses its sought after hallucinogenic effect, it is contemplated that the present invention include the ability to withdraw spent catnip from the present recreational pet toy and to insert fresh catnip when needed. In order to facilitate this aspect of the present invention, a catnip fill port 26 is provided. Ideally, fill port 26 is funnel-shaped and is configured within rigid planar member 24 having a relatively wide mouth 30 for receiving catnip and a relatively narrow port 31 for communicating catnip to elongated channel 25.

Figure 4A:
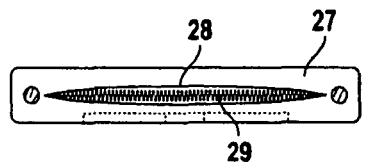
FIG. 4A is a top plan view of one embodiment of the recreational pet toy of FIG. 3.

In that a user of the FIG. 3 embodiment of the present invention would like to prevent catnip from inadvertently spilling from the recreational cat toy, it is contemplated that the entry to funnel-shaped channel 26 be capable of being selectively closed. In doing so, reference is made to FIG. 4A which is the top view of recreational pet toy 20. Specifically, top surface 27 is provided with an opening 28 in fabric covering 22. As the opening is spread, a suitable closure such as a hook and loop fastener or zipper 29 is exposed.

Figure 4B:
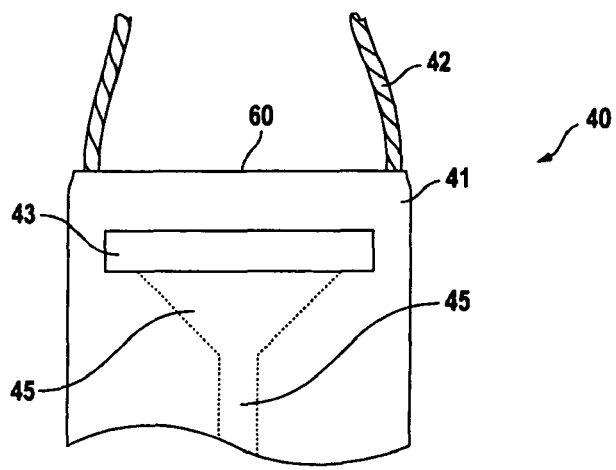
FIGS. 4B and 4C are partial side plan views showing alternative embodiments of the recreational pet toy of the present invention to those depicted in FIGS. 1A, 1B and 2.

As further embodiments of the present invention, it is noted that the funnel-shaped catnip feed port need not open merely at the top of the recreational pet toy. In this regard, reference is made to FIGS. 4B and 4C. Turning first to FIG. 4B, funnel-shaped channel 45 begins on face 41 of its rigid planar member spaced apart from top edge 60. In order to gain access to funnel-shaped channel 45, fabric flap 43 is provided beneath which is situated a suitable hook and loop fastener or zipper (not shown). In operation, flap 43 would be raised, hook and loop fastener or zipper located beneath flap 43 would be opened and catnip introduced to funnel-shaped channel 45 in communication with linear channel 44. Upon doing so, recreational pet toy 40 could be hung from a doorknob or similar fixture through the use of rope or cord 42 as previously discussed.

Figure 4C:
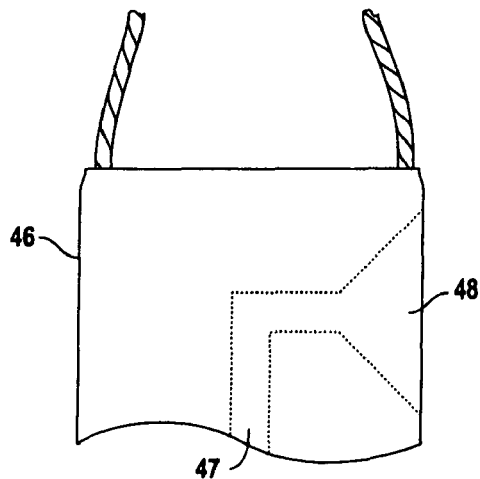
Figure 4D:
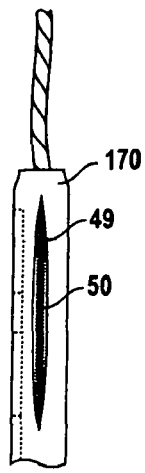
FIG. 4D is a partial side plan view of the recreational pet toy of FIG. 4C.

As yet a further embodiment, reference is made to FIGS. 4C and 4D whereby funnel-shaped channel 48 is shown opening to side edge 170. In using recreational pet toy 46, fabric overlaying edge 70 would be opened as shown by slit 49 exposing hook and loop fastener or zipper closure 50. Catnip would then be introduced into funnel-shaped channel 48 for communication to linear channel 47.

Turning once again to FIGS. 1A and 1B, a pet toy capable of hanging from a vertical surface, such as a door knob is shown. These rectangular shaped toys are again provided with a substantially planar surfaces which can be covered with such diverse materials as sisal, carpet, and the like. Hanging is accomplished through the use of rope or cord 15. As in the embodiments previously discussed, it is an important element of the present invention to provide these hanging pet toys with a source of catnip. Rather than employing the channel structure shown in FIG. 3, catnip can be introduced to the interior of hanging pet toy 10 in several ways. For example, in turning first to FIG. 1C, fabric flap 18 can be provided on a sidewall of recreational pet toy 10 to enable a user to open the sidewall 16 of recreational pet toy 10 to introduce catnip therein. This could be done by either pouring loose catnip leaves through an opening beneath flap 18 or, alternatively, catnip can be placed within a pouch and the pouch inserted therein.

Figure 1D:
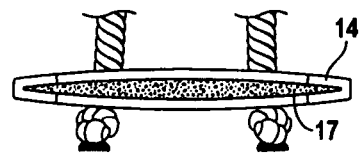
FIG. 1D is a top view of the present invention.

As an alternative embodiment, reference is made to FIG. 1D. In this instance, top surface 14 is provided with a slit or opening 17 which can be expanded either by pressing against the two vertical walls proximate top surface 14 or by providing a zippered hook-and-loop closure thereon. In either instance, once opening 17 has been provided, catnip leaves can be poured within the interior of recreational pet toy 10. A channel can be provided within the fabric structure of this pet toy to enable the catnip to extend substantially throughout its longitudinal length.

In the embodiments disclosed herein, once the catnip has been spent and the catnip odor substantially depleted, flap 18 or opening 17 can be accessed such that the catnip contained within recreational pet toy 10 can be dispensed simply by appropriately orienting the recreational pet toy 10 upside down and shaking it until the catnip leaves or appropriately withdrawn.

Figure 5:
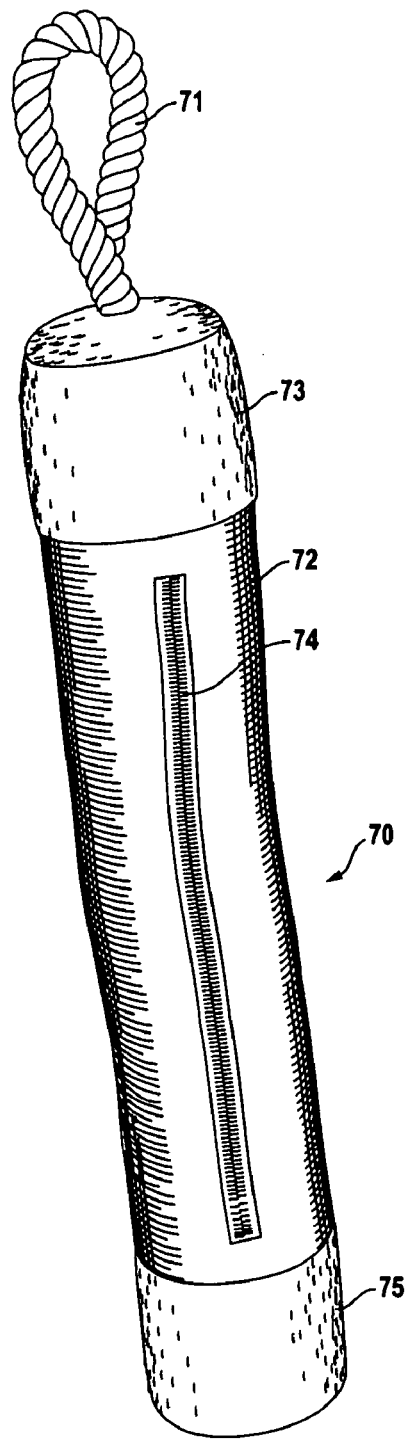

Although the discussion to this point has involved substantially planar recreational pet toys, the present invention need not be so limited. For example, reference is made to FIG. 5 depicting recreational pet toy 70. This rather plush cylindrically shaped pet toy can hang from a suitable support such as a door knob by employing rope or cord 71. The pet toy can also include a fabric outer surface 72 and be made stylistic by employing end cap 73.

As in the previous embodiments, it is desirable to provide catnip throughout the length of recreational pet toy. This can be done in several ways. As a first embodiment, a zipper or hook-and-loop fastener 74 can be configured within fabric surface 72 to enable one to selectively gain access to the interior of recreational pet toy 70. Once closure element 74 has been opened, catnip leaves can be applied through substantially the entire length of the pet toy.

Figure 6:
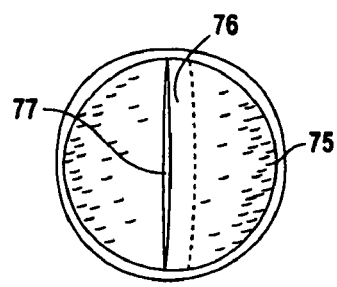
FIGS. 6 and 7 are bottom and top plan views respectively of the embodiment of the pet toy as depicted in FIG. 5.
Figure 7:
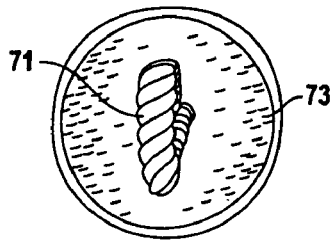

As an alternative embodiment, reference is made to FIG. 6. FIG. 6 shows the bottom end cap 75 of recreational pet toy 70. This end cap can be provided with a fabric closure 76 selectively opening slit 77. Once slit 77 has, in fact, been opened, catnip leaves can be applied thereto and if an appropriate channel is configured within the interior of recreational pet toy 70, the catnip can be caused to extend substantially through its entire length.

It is quite apparent that there are a number of alternative choices one could make in replicating the present invention. No attempt was made in describing the present invention to exhaustively encompass all fabric, rug, rope or other suitable surfaces to be used as cat scratching media. Certainly, there are a myriad of such choices currently available, all of which could be employed herein. Further, although applicant has disclosed three possible configurations for feeding catnip to the interior of the present recreational pet toy, certainly other geometric configurations could be made while remaining within the spirit and scope of the present invention. In this regard, although only rectangular recreational pet toys were disclosed, other shapes and sizes could be made in the practice of the present invention.

It is further noted that the size, depth and orientation of the elongated channel employed to receive catnip could be of various alternative geometric shapes while remaining within the teachings of the present invention when dealing with the embodiment of FIG. 3, for the sake of ease of manufacture, it is contemplated that the rigid planar member be routed to create a linear channel in one of its surfaces. Routing a linear channel is certainly the most cost effective way of protecting this embodiment. However, there are certainly other circuitous paths that can be taken and any of them are considered to be embraced by these teachings.

What is claimed is:

1. A recreational pet toy for cats comprising a rigid planar member, an outer covering for said rigid planar member and a cord attached to said pet toy for hanging said recreational pet toy during use, said rigid planar member comprising a single elongated unobstructed channel extending substantially the entire length of said rigid planar member for receiving catnip and for distributing said catnip along said rigid planar member.

2. The recreational pet toy of claim 1 wherein said outer covering comprises a member selected from the group consisting of sisal, carpet, fabric and rope.

3. The recreational pet toy of claim 1 wherein said rigid planar member is substantially rectangular having a relatively short dimension and relatively long dimension, said long dimension oriented vertically when said recreational pet toy is in use.

4. The recreational pet toy of claim 3 wherein said elongated channel is a linear channel that lies substantially along the entire length of said long dimension.

5. The recreational pet toy of claim 1 wherein said elongated channel is characterized as having a single catnip fill port.

6. The recreational pet toy of claim 5 wherein said catnip fill port is a substantially funnel-shaped channel configured within said rigid planar member, the substantially funnel-shaped channel having a relatively wide mouth for receiving catnip and a relatively narrow port in communication with said elongated channel for transferring catnip from said substantially funnel-shaped channel substantially to the entire length of said elongated channel.

7. The recreational pet toy of claim 6 wherein said relatively wide mouth opens at an edge of said rigid planar member.

8. The recreational pet toy of claim 7 wherein said edge is at the top of said rigid planar member.

9. The recreational pet toy of claim 7 wherein said edge is at the side of said rigid planar member.

10. The recreational pet toy of claim 6 wherein said relatively wide mouth opens on a face of said rigid planar member spaced from an edge thereof.

11. The recreational pet toy of claim 6 wherein said relatively wide mouth is located beneath a selectively closeable opening in said outer covering.

12. The recreational pet toy of claim 11 wherein said selectively closeable opening is closeable by use of a zipper or hook and loop fastener.

13. The recreational pet toy of claim 1 wherein said outer cover is permeable to catnip odors emanating from catnip contained within said channel.

14. The recreational pet toy of claim 1 wherein said cord is sized to enable said recreational pet toy to hang from a doorknob during use.

15. A recreational pet toy for cats, said recreational pet toy having a width and length and an outer covering of a material to encourage cat scratching but which is resistant to wear caused by such scratching, said recreational pet toy further comprising a single elongated unobstructed channel substantially extending the entire length of said pet toy for receiving catnip therein through a single catnip feed port.

16. The recreational pet toy of claim 15 wherein said recreational pet toy is substantially planar.

17. The recreational pet toy of claim 16 wherein said catnip is introduced in a selectively closeable opening in either one edge or on a planar surface thereof.

18. The recreational pet toy of claim 15 wherein said recreational pet toy includes a substantially tubular body capable of being selectively opened for the introduction of catnip substantially throughout its interior.

\* \* \* \* \*